United States Patent [19]

Miyatake et al.

[11] Patent Number: 5,092,664
[45] Date of Patent: Mar. 3, 1992

[54] LIQUID CRYSTAL IMAGE PROJECTION SYSTEM

[75] Inventors: Yoshito Miyatake; Takaaki Tanaka, both of Neyagawa, Japan

[73] Assignee: Matsushita Electric Industrial Co., Ltd., Osaka, Japan

[21] Appl. No.: 314,073

[22] Filed: Feb. 23, 1989

[30] Foreign Application Priority Data

Feb. 25, 1988 [JP] Japan .................................. 63-42662

[51] Int. Cl.$^5$ .............................................. G02F 1/13
[52] U.S. Cl. ...................... 359/41; 353/122; 359/75; 359/54; 359/99
[58] Field of Search ............... 350/347 E, 334, 331 R, 350/333; 353/127, 119

[56] References Cited

U.S. PATENT DOCUMENTS

| | | | |
|---|---|---|---|
| 2,642,487 | 2/1947 | Schroeder | 340/370 |
| 4,039,252 | 8/1977 | Mizuno et al. | 350/334 |
| 4,060,316 | 11/1977 | Pollack et al. | 353/122 X |
| 4,497,542 | 2/1985 | Kaye | 350/347 EX |
| 4,652,088 | 3/1987 | Kando et al. | 350/334 |
| 4,756,604 | 7/1988 | Nakatsuka et al. | 350/334 X |
| 4,790,632 | 12/1988 | Miyakawa et al. | 350/334 X |
| 4,824,210 | 4/1989 | Shimazaki | 350/331 R |

FOREIGN PATENT DOCUMENTS

| | | |
|---|---|---|
| 61-32819 | 2/1986 | Japan .................. 350/334 |
| 62-156623 | 7/1987 | Japan .................. 350/332 |
| 62-237485 | 10/1987 | Japan . |
| 62-258491 | 11/1987 | Japan . |
| 2179484 | 3/1987 | United Kingdom . |

OTHER PUBLICATIONS

Fergason, "Performance of a Matrix Display Using Surface Mode", IEEE, Oct. 1980, pp. 177-179.
Morozumi et al., LDC Full-Color Video Projector, SID 86 Digest, pp. 375-378.
Morozumi et al., LCD Full Color Video Projects, SID Digest 1986, p. 375.
Ledebuhr, Full Color Single-Projection Lens, etc. SID Digest 1986, p. 379.
Aruga et al., High Resolution Full Color Video Projector, etc., SID Digest 1987, p. 75.

Primary Examiner—Stanley D. Miller
Assistant Examiner—Huy K. Mai
Attorney, Agent, or Firm—Wenderoth, Lind & Ponack

[57] ABSTRACT

A liquid crystal image projection system projects an enlargement of an image formed in an active matrix liquid crystal panel onto a screen by using a lamp and a projector lens. The orientation of the liquid crystal panel is made such that a molecular axis vector directed from an input light side end to an output light side end of each liquid crystal molecule in the middle of the liquid crystal layer has a vector component opposite to the scanning direction of the panel, and a convergent light is entered into the liquid crystal panel. The system can solve the problem of nonuniformity of the signal voltage-transmittance characteristic of the entire screen.

3 Claims, 11 Drawing Sheets

LIQUID CRYSTAL IMAGE PROJECTION SYSTEM

BACKGROUND OF THE INVENTION

1. Field of the Invention

This invention relates to a liquid crystal image projection system for modulating a light beam by a optical image formed in a liquid crystal panel, and projecting it on a screen by means of a projection lens.

2. Description of the Prior Art

Figure 11:
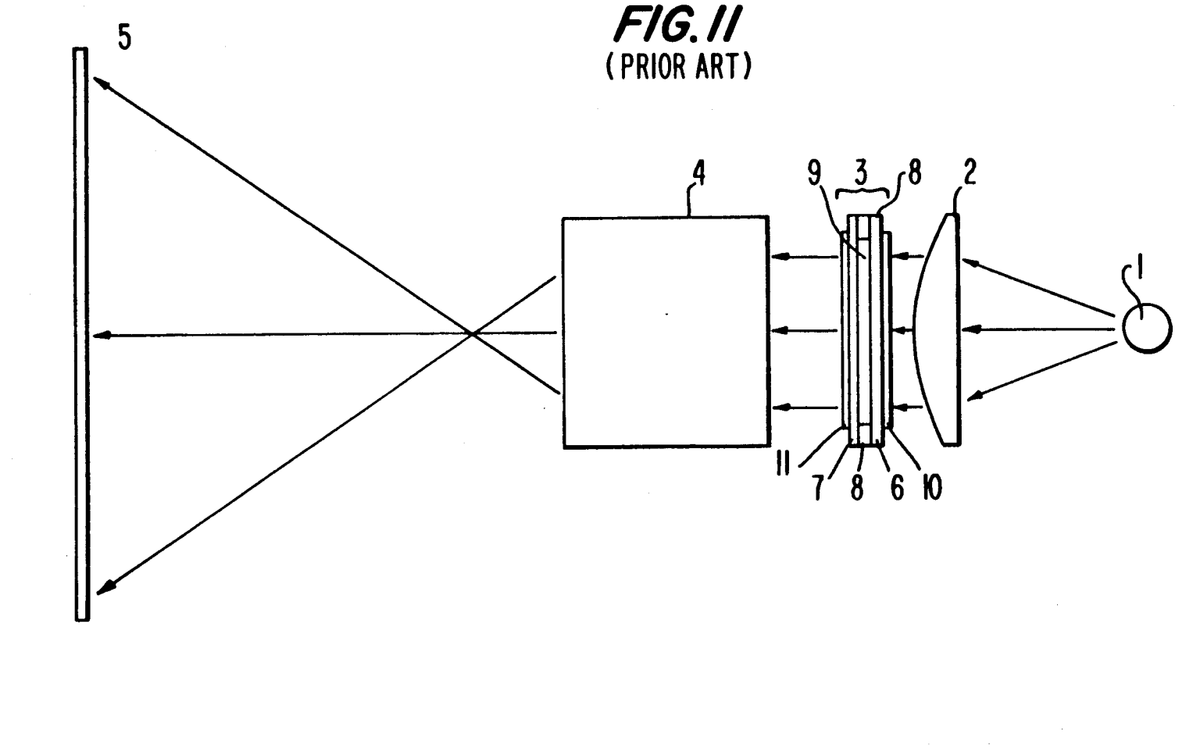
FIG. 11 is a schematic diagram showing the structure of a conventional liquid crystal image projection system.

In order to obtain a television picture on a large screen, a method of passing a light beam emitted from a light source through a small-sized light valve having formed therein an optical image corresponding to a video signal, and projecting an enlargement of this optical image onto the screen is known. Recently, the method of using liquid crystal as the light valve has been proposed. For example, Morozumi et al. proposed, in "LCD Full-Color Video Projector," SID 86 Digest, p. 375, a projection type display device using an active matrix type liquid crystal light valve. An example of the basic conventional structure of such liquid crystal light valve optical device is shown in FIG. 11.

The light emitted from a lamp 1 is converted into nearly parallel light by a light collecting device 2, and enters a projector lens 4 through a liquid crystal panel 3. In the liquid crystal panel, an optical image is formed corresponding to the video signal as a change in the transmittance, and this optical image is magnified and projected on a screen 5 through the projector lens 4. The liquid crystal panel 3 is formed by joining two spaced opposed glass substrates 6, 7 by applying a sealant 8 on the periphery, filling the internal enclosed space with a liquid crystal material 9 in twisted nematic (TN) mode, and disposing polarizers 10, 11 outside the glass substrates 6, 7. By applying an electric field to the liquid crystal layer of the liquid crystal panel 3, the transmittance of the liquid crystal panel 3 can be controlled.

Figure 12:
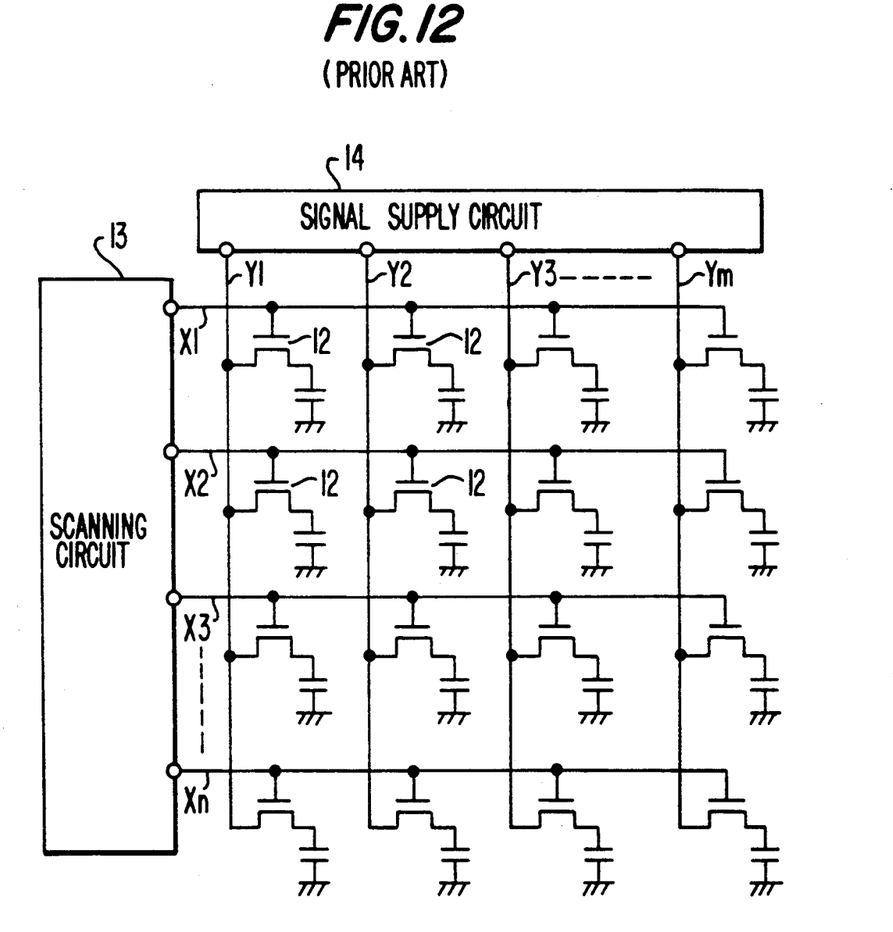
FIG. 12 is an equivalent circuit diagram of an active matrix liquid crystal panel using TFTs.

As one of the methods for driving the liquid crystal panel, the active matrix system is known, in which switching elements such as thin film transistors (TFTs) and nonlinear elements are connected to the pixel electrodes. FIG. 12 shows an equivalent circuit of the active matrix liquid crystal panel using TFTs. Near the intersections of scanning electrodes $X_1, X_2, \ldots, X_n$ and signal electrodes $Y_1, Y_2, \ldots, Y_m$ formed in a matrix, TFTs 12 are formed as switching elements, and the gate and source of each TFT are connected to the corresponding scanning electrode and signal electrode. Each pixel electrode is connected to the drain of a corresponding TFT. The liquid crystal layer of one pixel may be regarded as a capacitor.

The scanning electrodes and signal electrodes are connected to a scanning circuit 13 and a signal supply circuit 14, respectively. The scanning circuit 13 is of linear sequential type, and sequentially scans the scanning electrodes $X_1, X_2, \ldots, X_n$, to simultaneously turn on all TFTs connected to each scanning electrode and turn off all other TFTs. Synchronizing with this scanning, signals are applied to the pixel electrodes connected to the TFTs in ON state through the signal electrodes $Y_1, Y_2, \ldots, Y_m$ from the signal supply circuit 14. While the TFTs are OFF, the pixel electrodes are maintained at respective constant voltages.

Thus, in the active matrix system, using multiple scanning electrodes, images of high quality can be formed, so that the liquid crystal image projection system is considered ideal for obtaining television images on a large screen.

However, the active matrix system involves the following problems. When a direct current is continuously applied to the liquid crystal material, electric and optical characteristics deteriorate. Thus, generally the pixels are driven by an AC voltage so that DC components will not be applied to the liquid crystal materials. The simplest method is to invert the polarity of the signal voltage in every scanning period.

In the active matrix system, since the OFF resistance of the switching elements is not perfectly infinite, when the polarity of the signal voltage is inverted in every specific period, the absolute value of the voltage to be held by each pixel is lowered with the passing of the time, and the effective voltage applied to each pixel becomes smaller than the absolute value of the signal voltage. By entering parallel light into the liquid crystal panel and applying identical signal voltages to the pixels, the brightness of the projected image varies along the scanning direction. This is called the brightness gradient The brightness gradient may be improved to a certain extent by modulating the signal voltage in the scanning period. But, since the service range of the signal voltage-transmittance characteristics becomes narrow, gradation characteristics will not be sufficient. Further, if the brightness gradient is too large, correction is impossible.

SUMMARY OF THE INVENTION

It is hence a primary object of this invention to provide a liquid crystal image projection system of high picture quality by solving the problem of the brightness gradient.

A liquid crystal image projection system of this invention comprises light collecting means for converting light emitted from a lamp into convergent light, an active matrix liquid crystal panel for modulating the convergent light from the light collecting means, and a projector lens receiving output light from the liquid crystal panel for projecting an image formed on the liquid crystal panel onto a screen, in which the orientation of the liquid crystal panel is such that a molecular axis vector directed from an input light side end to an output light side end of each liquid crystal molecule at the middle of the liquid crystal panel has a vector component in a direction opposite to the scanning direction of the liquid crystal panel.

In this arrangement in which the molecular axis vector of each liquid crystal molecule disposed at the middle of the liquid crystal layer has a vector component which is opposite to the scanning direction and the convergent light enters the liquid crystal panel, when the effective voltages of all pixels are identical, the angle formed between the molecular axis vector of each liquid crystal molecule at the middle of the liquid crystal layer and the light ray direction becomes smaller in the scanning direction, so that the optical anisotropy of the pixels becomes smaller in the scanning direction.

If the OFF resistance of the switching elements for driving the pixels is not perfectly infinite, when identical signal voltages are applied to all pixels, the effective voltages applied to the pixels become smaller in the scanning direction. As the effective voltage becomes larger, the optical anisotropy becomes smaller.

In this way, the action due to the OFF imperfection of the switching elements and the action due to difference in the angle formed by the molecular axis vector and the light ray direction work in mutually canceling directions. Therefore, when applying identical signal voltages to all pixels, the change of the optical anisotropy of pixels in the scanning direction is smaller in the convergent light entrance as compared with the parallel light entrance. As a result, the problem of non-uniformity of the signal voltage-transmittance characteristic of the entire screen can be improved.

These and other features and effects of this invention will be better understood and appreciated from the following detailed description taken in conjunction with the accompanying drawings in which:

BRIEF DESCRIPTION OF THE DRAWINGS

FIGS. 6 (a), (b) and (c) are voltage waveform diagrams showing an output voltage waveform of the signal supply circuit, an output voltage waveform of the scanning circuit and a voltage waveform at the pixel electrode, respectively;

FIGS. 7 (a), (b) and (c) are voltage waveform diagrams showing the voltage waveforms at the pixel electrodes in the upper, middle and lower parts of the liquid crystal panel, respectively;

FIGS. 9 (a) and (b) are schematic views for explaining the state of liquid crystal molecules;

FIGS. 10 (a) and (b) are illumination distribution diagrams showing the illumination profiles on the screen of a conventional liquid crystal image projection system and the liquid crystal image projection system of the invention, respectively;

DETAILED DESCRIPTION OF THE PREFERRED EMBODIMENTS

Figure 1:
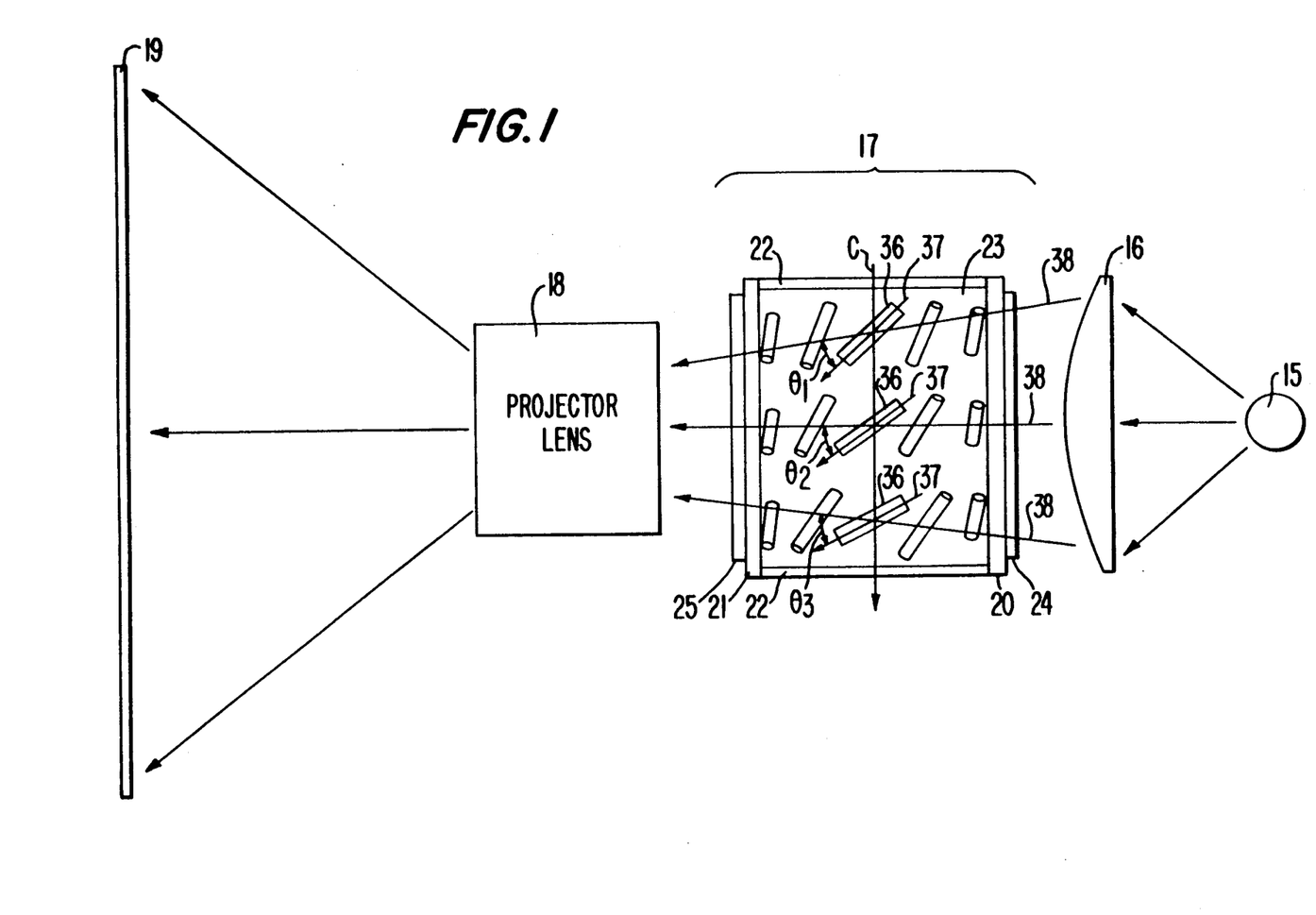
FIG. 1 is a schematic diagram showing the structure of a liquid crystal image projection system according to an embodiment of the invention.

FIG. 1 shows a structure of an optical system according to one embodiment of this invention. The light emitted from a lamp 15 is converted into convergent light by a light collecting device 16. The convergent light from the light collecting device 16 enters a liquid crystal panel 17, and an optical image formed as a change in transmittance in the liquid crystal panel 17 is magnified and projected onto a screen 19 by a projector lens 18.

Figure 2:
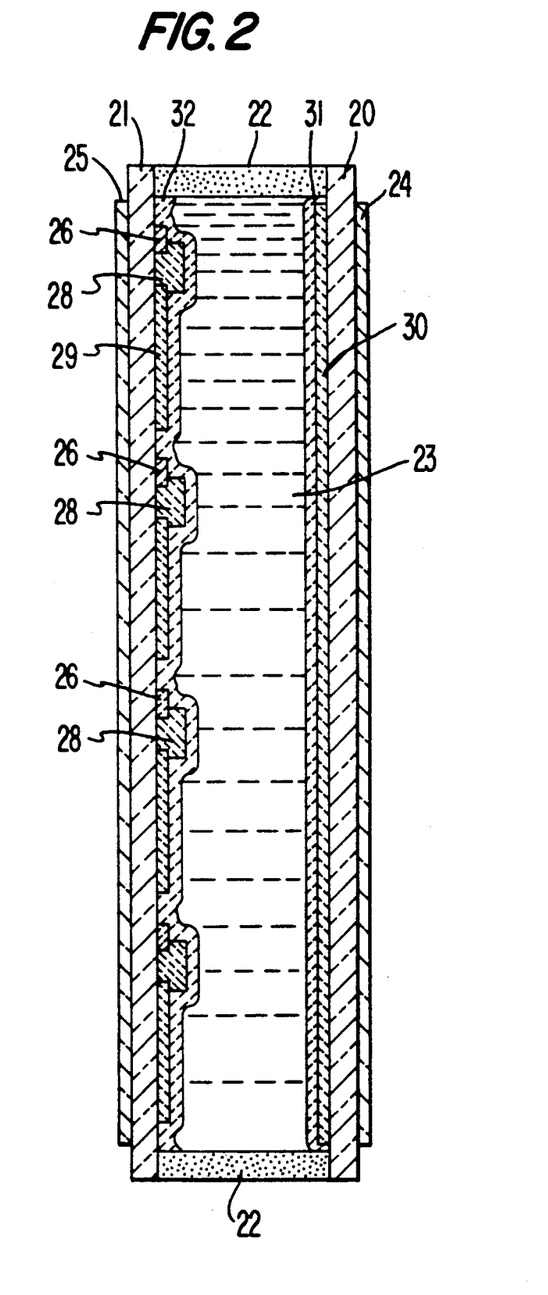
FIG. 2 is a sectional view showing a structure of a liquid crystal panel.
Figure 3:
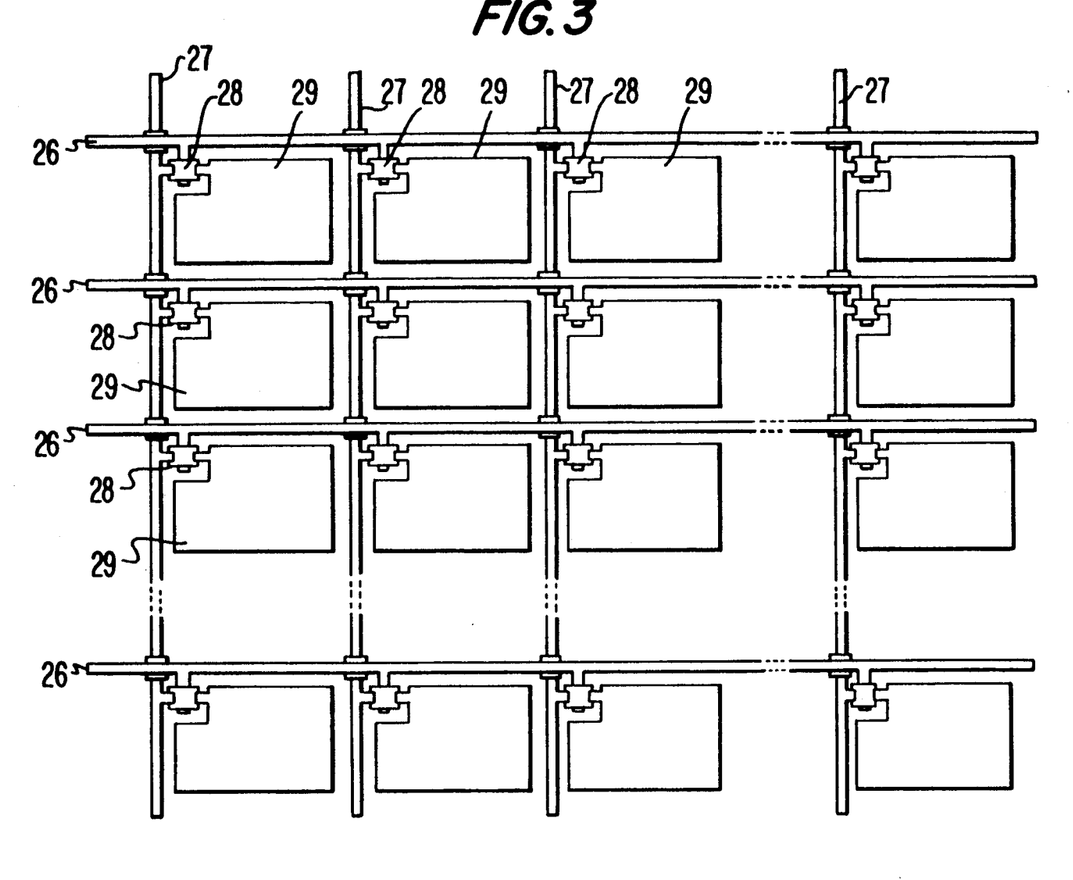
FIG. 3 is a schematic plan view showing a structure of a glass substrate on which TFTs are arranged.

FIG. 2 shows a sectional view of the liquid crystal panel 17. The peripheries of two spaced opposed glass substrates 20, 21 are adhered by using a sealant 22, and the internal enclosed space is filled with a TN liquid crystal material 23. Polarizers 24, 25 are placed outside the glass substrates 20, 21. On one glass substrate 21, as shown in FIG. 3, scanning electrodes 26 and signal electrodes 27 are formed in a matrix, and TFTs 28 using amorphous silicon are formed near the intersections of the scanning electrodes 26 and signal electrodes 27 as switching elements. In the region enclosed by the scanning electrodes 26 and signal electrodes 27, pixel electrodes 29 of indium tin oxide (ITO) in a thin film are formed. The source, gate and drain of each TFT 28 are connected to the corresponding signal electrode 27, scanning electrode 26 and picture element electrode 29, respectively. On the other glass substrate 20, a common electrode 30 of ITO thin film is formed. Orientation films 31, 32 are formed each at the interface surface of the liquid crystal.

Figure 4:
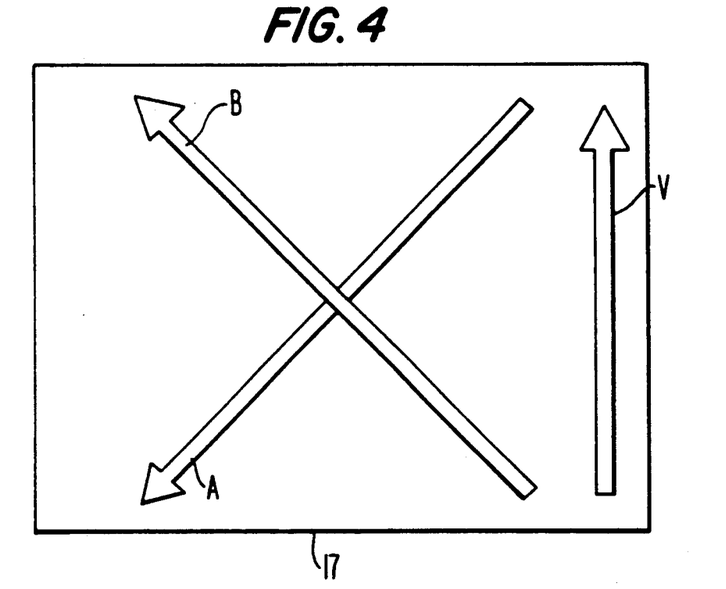
FIG. 4 is a plan view for explaining the rubbing direction of the orientation film.

The orientation films 31, 32 are rubbed in order to align the molecular axes of the liquid crystal molecules. Referring to FIG. 4, the rubbing directions, when viewing the liquid crystal panel 17 from the projector lens 18 side, are in a direction A at the input light side and in a direction B at the output light side, supposing the scanning direction to be V. The rubbing direction of the orientation film 31 on the input light side is about 45 degrees to the scanning direction V in the direction from upper right to the lower left side in the drawing, and the rubbing direction of the orientation film 32 at a the output light side is nearly at right angle to the rubbing direction of the orientation film 31 at the input light side. As a result, the liquid crystal molecules are arranged so that the molecular axis is twisted about 90 degrees from the input light side to the output light side.

The operation of the system of the invention is described below.

Figure 5:
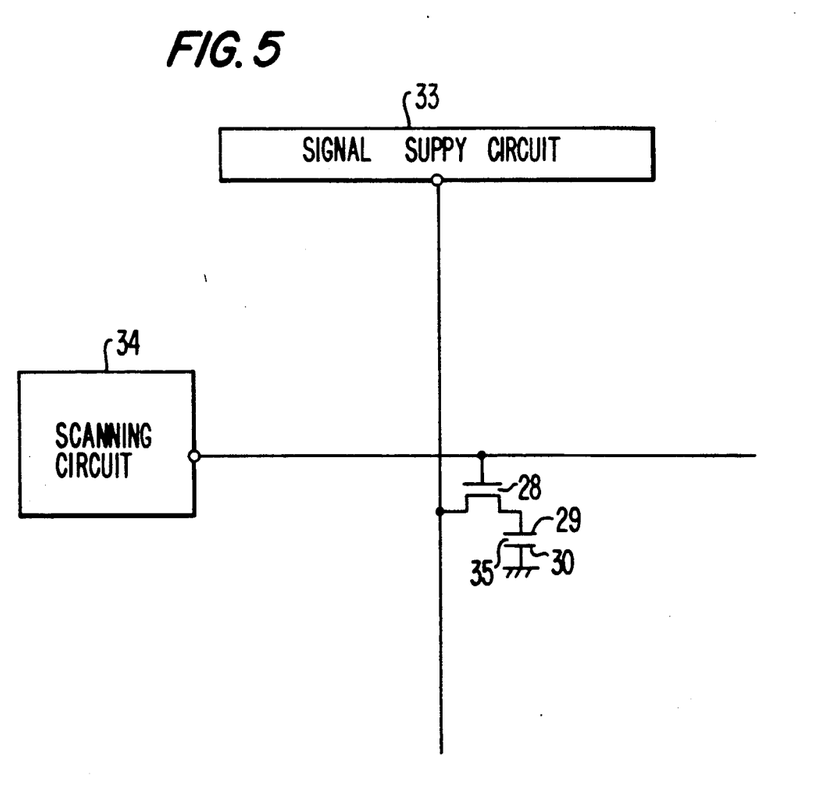
FIG. 5 is an equivalent circuit diagram for explaining the operation of TFT.

First the operation of a TFT is explained. FIG. 5 is an equivalent circuit showing a pixel at the portion corresponding to the middle part of the screen, in which the source, gate and drain of TFT 28 are connected to the signal supply circuit 33, scanning circuit 34, and pixel electrode 29. The liquid crystal layer held between the picture element electrode 29 and common electrode 30 forms a capacitor 35.

Figure 6A:
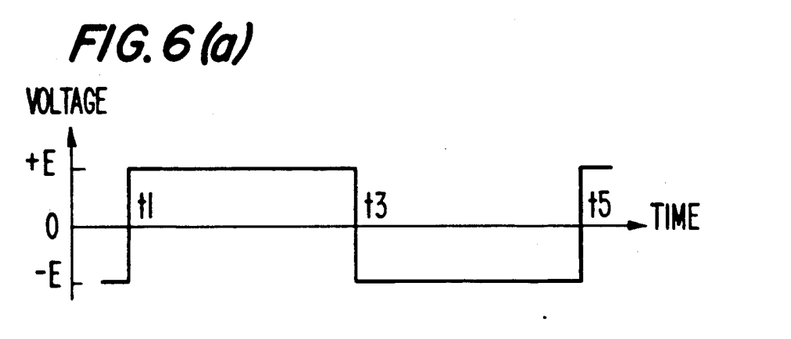
Figure 6B:
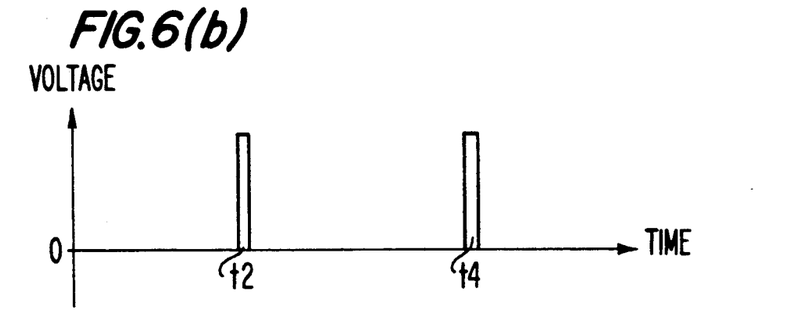
Figure 6C:
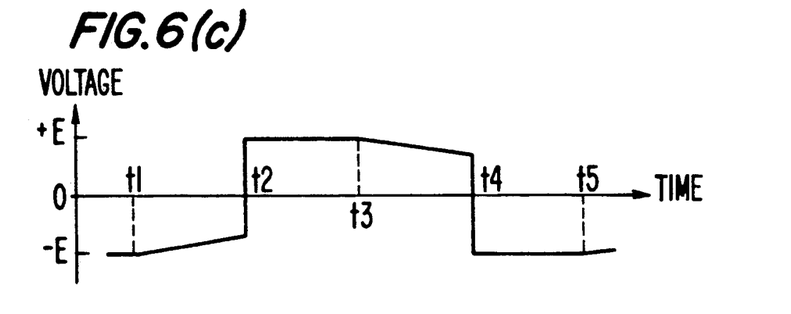

FIGS. 6 (a), (b) and (c) show the output voltage waveform of the signal supply circuit 33, the output voltage waveform of the scanning circuit 34 and the voltage waveform of the pixel electrode 29, respectively. The output voltage waveform of the signal supply circuit 33 is $+E$ from time $t_1$ to time $t_3$, and $-E$ from time $t_3$ to time $t_5$. That is, the polarity is inverted cyclically in the scanning period without changing the absolute value. The scanning circuit 34 generates pulses at specified times $t_2$, $t_4$ within the scanning period from the top to the bottom of the screen. The TFT 28 is ON for a short period when the pulse is present, and is OFF in the remainder of the period. When the TFT 28 is turned ON at time $t_2$, since the signal voltage is $+E$, the capacitor 35 is quickly charged, and the voltage of the pixel electrode 29 becomes very close to $+E$. Since the signal voltage is $+E$ from time $t_2$ to time $t_3$, the voltage of the pixel electrode 29 is hardly changed. At time $t_3$, when the signal voltage is inverted to $-E$, the potential difference of the signal voltage from the voltage at the pixel electrode 29 becomes $2E$, so that the absolute value of the voltage at the pixel electrode 29 decreases from time $t_3$ to time $t_4$ depending on a time constant determined by the OFF resistance of TFT 28 and the capacitor 35. Thus, one scanning period is divided into the phase in which the voltage of the pixel electrode 29 and the output voltage of the signal supply circuit 33 are in the same polarity and into the other phase differing in polarity. In the same-polarity phase, the pixel electrode 29 holds the signal voltage, but in the different-polarity phase, the voltage of the pixel electrode 29 changes in a direction to decrease the absolute value with the passing of time.

Figure 7A:
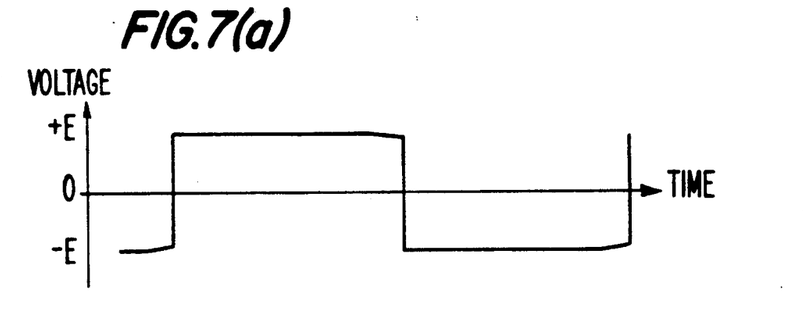
Figure 7B:
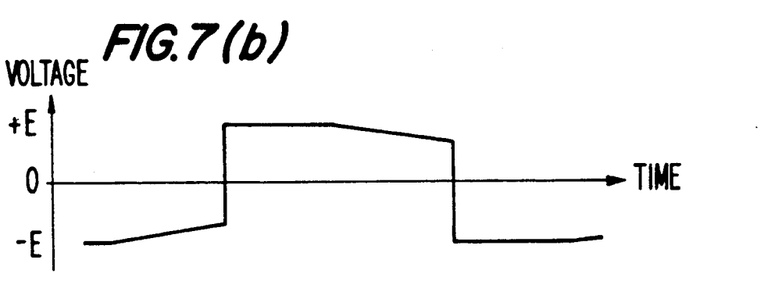
Figure 7C:
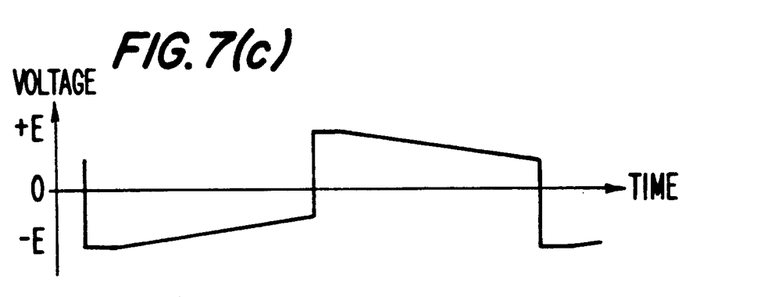

The voltage waveforms of the pixel electrodes at portions corresponding to the upper part, middle part and lower part of the screen are respectively shown in FIGS. 7 (a), (b) and (c). Since the different-polarity phase becomes longer in the scanning direction (from top to bottom of the screen), the effective voltage of the pixel electrode drops along the scanning direction. That is, by the OFF imperfection of the TFT, the voltage holding ability is lowered along the scanning direction.

Next is explained the action when a convergent light is inputted into the liquid crystal panel.

Figure 8:
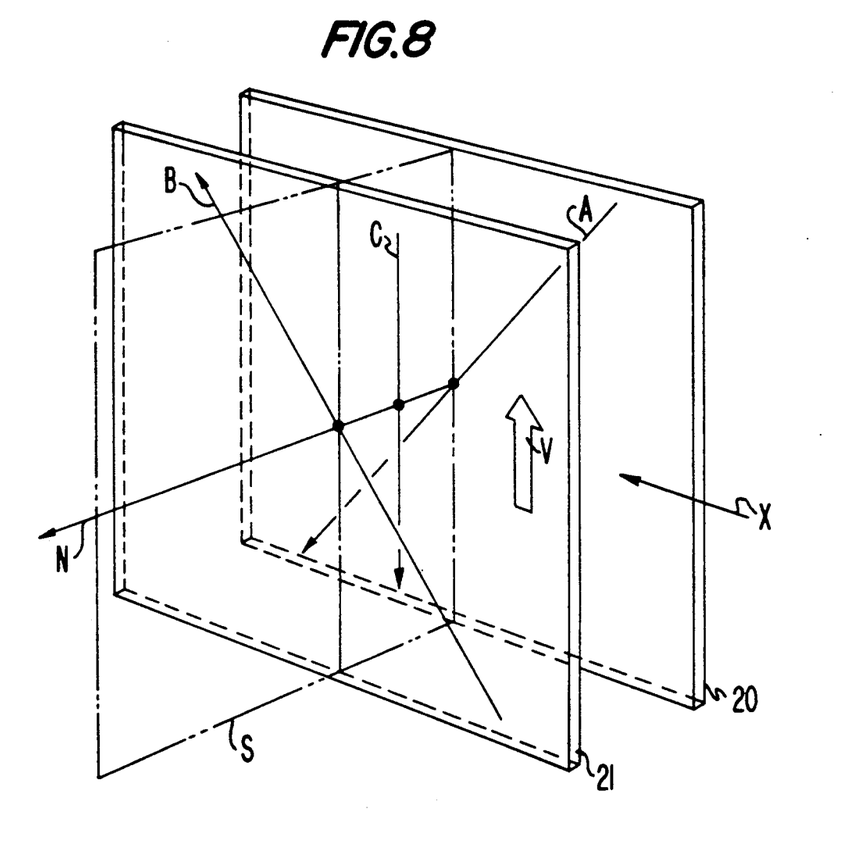
FIG. 8 is a perspective view for explaining the directions related to the rubbing direction of the orientation film.

As shown in FIG. 8, the rubbing directions of the orientation films at the input light side and output light side are supposed to be A and B, respectively. Suppose that the direction of dividing the angle formed by the direction A and the opposite direction to the direction B into two equal divisions be C, the direction to the normal of the liquid crystal layer seen in the light beam direction be N, the direction perpendicular to the direction C and direction N be X, and the plane containing the direction C and direction N be s.

Figure 9A:
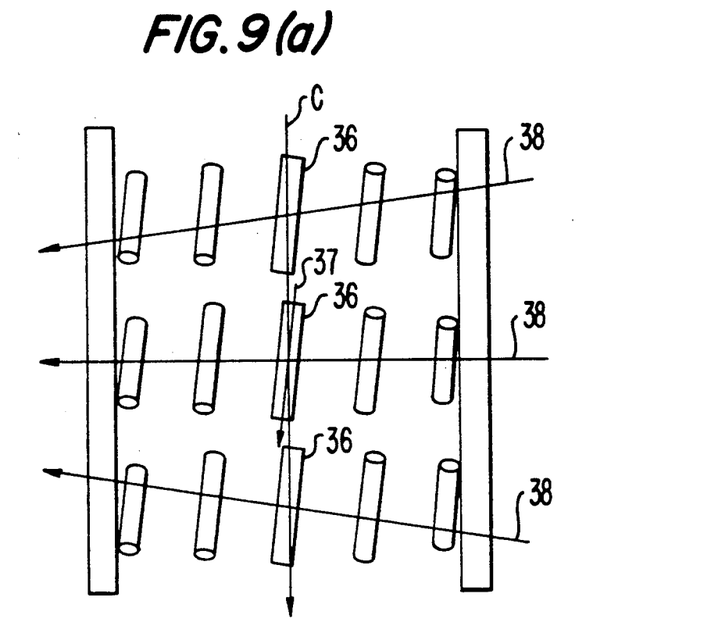
Figure 9B:
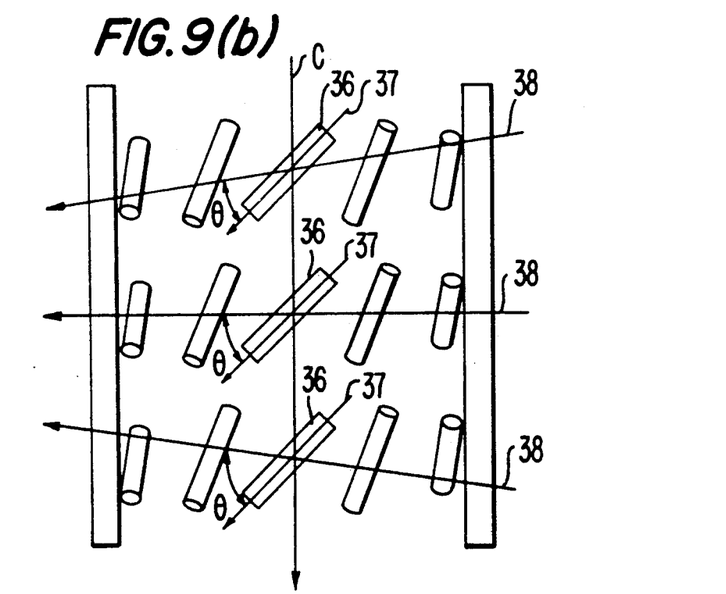

Since the liquid crystal molecules are arranged so as to be separated from the glass substrate along the rubbing direction, when the state of the liquid crystal molecules in the nonelectric field is seen from direction X, the molecular axes of all liquid crystal molecules may look parallel as shown in FIG. 9 (a), and the end of the output light side is in direction C. The molecular axis of the liquid crystal molecule 36 at the intermediate position of the liquid crystal layer is parallel to plane s. When the state of the liquid crystal molecules when applying an electric field to the liquid crystal layer is seen from direction X, the direction of the liquid crystal molecular axis approaches the direction of the electric field as shown in FIG. 9 (b), but the end of the output light side of all liquid crystal molecules are still offset from the direction of the electric field in the direction C.

In the liquid crystal molecule 36 at the middle position of the liquid crystal layer in FIGS. 9 (a), (b), if the electric field is varied, the molecular axis remains parallel to plane s, and since most optical characteristics are nearly symmetrical to the plane s, qualitatively, the liquid crystal molecules in the middle of the liquid crystal layer may be regarded as average liquid crystal molecules. The vector 37 running from the input light side and to the output light side end along the molecular axis of the liquid crystal molecules 36 at the middle of the liquid crystal layer is called the molecular axis vector. The optical anisotropy becomes larger as the angle $\theta$ formed by the direction of the molecular axis vector 37 and the light beam direction 38 becomes larger. In all picture elements, when the tilting of the liquid crystal molecular axis toward the electric field direction is identical and the convergent light enters into the liquid crystal panel, the angle $\theta$ formed by the direction of the molecular axis vector 37 and the light ray direction 38 becomes greater along direction C, the optical anisotropy increases along direction C.

Let us now suppose a case in which the direction C shown in FIG. 8 is opposite to the scanning direction V, where the liquid crystal panel is scanned from the bottom to the top in the figure, and the same signal voltages are applied to all pixels. Since the effective voltages of the pixel electrodes become smaller along the scanning direction, this acts to increase the optical anisotropy along the scanning direction. On the other hand, if the effective voltages of the pixel electrodes are the same, the angle $\theta$ formed by the direction of the molecular axis vector 37 and the light ray direction 38 becomes smaller in the scanning direction, which causes the optical anisotropy to decrease along the scanning direction. Therefore, the action due to OFF imperfection of TFT and the action due to the angle formed by the average liquid crystal molecular axis and the light ray running direction are mutually canceled.

FIG. 1 shows the state of the liquid crystal molecules when signal voltages having a same value are applied to the pixel electrodes. Supposing the angle formed by the molecular axis vector of the liquid crystal molecule at the middle of the liquid crystal layer and the light ray direction of the convergent light to be $\theta$, it is defined as $\theta = \theta_1$ in the upper middle part of the liquid crystal panel, $\theta = \theta_2$ in the center middle part of the panel, and $\theta = \theta_3$ in the lower middle part of the panel. When properly selecting the angle formed by the ray passing through the screen upper middle part and the ray passing through the screen lower middle part so that $\theta_1$, $\theta_2$ and $\theta_3$ become nearly identical, ($\theta_1 = \theta_2 = \theta_3$), the difference of the optical anisotropy due to location when same signal voltages are applied to the pixels can be remarkably decreased. That is, the problem of the brightness gradient due to the OFF imperfection of TFT can be successfully solved.

The principal specifications of this embodiment are shown in Table 1.

TABLE 1

| | | |
|---|---|---|
| Liquid crystal panel | Number of pixels | 480 × 650 |
| | Display size | 42.7 mm × 56.6 mm |
| | TFT | Amorphous silicon |
| | Angle formed by the rubbing direction of input light side orientation film and the scanning direction | Approx. 45 degrees |
| | Angle formed by the rubbing direction of input light side orientation film and the rubbing direction of output light side orientation film | Approx. 90 degrees |
| Driving circuit | Vertical scanning period | 16.7 ms, Noninterlaced |
| Projector lens | F number | F2.4 |
| | Focal length | f = 54.3 mm |
| | Maximum field angle at screen side | $\omega = \pm 36°$ |
| | Maximum field angle of principal ray at liquid crystal panel side | $\omega' = \pm 11°$ |

The light collecting device causes the convergent light to enter so as to form a lamp image at the pupil position of the projector lens.

Figure 10A:
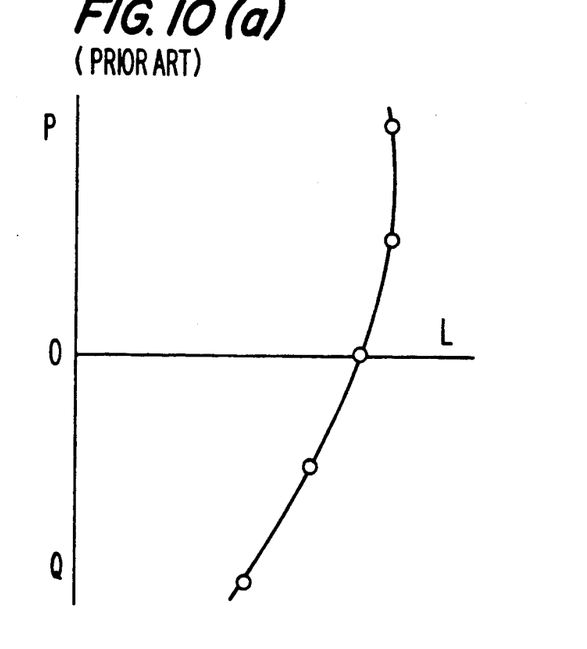
Figure 10B:
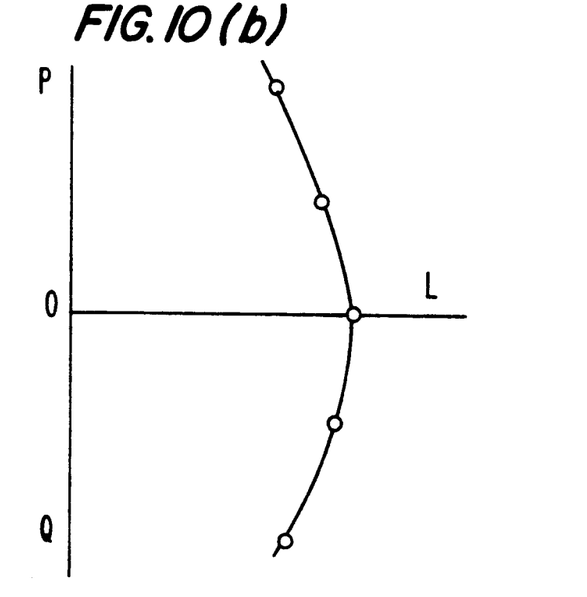

FIG. 10 (a) and FIG. 10 (b) show vertical direction illumination distribution diagrams from the upper middle part P through the center middle part O to the lower middle part Q on the screen when same signal voltages are applied to all pixels of the liquid crystal panels in the prior art of FIG. 11 and the structure of the present invention as shown in FIG. 1, respectively. In FIG. 11, the projector lens possesses the telecentric performance with F 4.5 and a maximum field angle of the principal ray at the liquid crystal panel side of $\omega' = \pm 3°$. The angle formed by the ray passing through the upper middle part of the liquid crystal panel and the ray passing through the lower middle part is 4° in the structure in FIG. 11, and 16° in FIG. 1. In FIG. 10 (a), from the screen upper middle part P to the screen lower middle part Q, the illumination L is lowered due to the action of the OFF imperfection of TFT. This drop of illumination L can be improved somewhat when the signal voltage is modulated in the scanning period, but the service range of the signal voltage-transmittance characteristic of the liquid crystal panel is narrowed. On the other hand, in FIG. 10 (b), the illumination reaches a maximum at the screen center O, and gradually decreases in the directions toward the peripheral areas of the screen. Between the screen upper middle part P and the screen lower middle part Q, the illumination L is slightly asymmetric, but this degree of illumination change may be sufficiently improved by modulating the signal voltage in the scanning period. Thus, the brightness gradient is improved while sufficiently making use of the range of the signal voltage-transmittance characteristic of the liquid crystal panel. It is because the screen illumination L is determined by $L = L_0 \cdot \eta \cdot \cos^4 \omega$ that the brightness is lowered from the screen center O to the peripheral area of the screen, where $L_0$ is the illumination at the screen center, $\eta$ is the vignetting factor of the projector lens, and $\omega$ is the field angle of the principal ray of the screen side of the projector lens. If the maximum picture angle $\omega'$ of the principal ray at the liquid crystal panel side of the projector lens is too large, the symmetricity of the illumination L between the screen upper middle part P and the screen lower middle part Q is largely broken. In FIG. 10, the changes in the illumination in the vertical direction along the middle of the screen is explained, but the same holds true for the entire screen.

If the direction C shown in FIG. 8 is not opposite to the scanning direction V, as far as the direction C has a component which is opposite to the scanning direction V, the action due to the OFF imperfection of TFT and the action by the angle formed by the average liquid crystal molecular axis and the light ray running direction cancel each other. By utilizing this phenomenon, magnitudes of the both actions can be balanced.

In the foregoing embodiment, the orientation of the liquid crystal molecules by rubbing is explained, but any other method of orientation may be used as long as the panel can act as a liquid crystal panel.

In the above embodiment, a liquid crystal panel of TN mode is described, but the invention is equally applied to other practical liquid crystal panels in different modes. In any case, it is sufficient to pay attention to the molecular axis vector of the liquid crystal molecules in the middle of the liquid crystal layer.

In the liquid crystal panel, instead of the TFTs as switching elements, nonlinear elements may be also used. The same effects as in the above embodiments may be obtained as far as the liquid crystal panel of the active matrix type is used.

What is claimed is:

1. A liquid crystal image projection system comprising:

an active matrix liquid crystal panel having first and second transparent substrates in spaced opposed parallel relation to each other and spaced a distance from each other, and a layer of liquid crystal material contained between said transparent substrates, one of said first and second transparent substrates having a common electrode thereon;

a plurality of pixel electrodes on the other of said transparent substrates arranged in a matrix, a plurality of switching elements connected to the plurality of pixel electrodes, respectively, a plurality of signal electrodes arranged in columns for supplying signal voltages to the plurality of pixel electrodes through the plurality of switching elements, and a plurality of scanning electrodes arranged in rows for selectively activating the plurality of switching elements on a row by row basis;

drive means responsive to an image signal for driving the liquid crystal panel by supplying the signal voltgages to the plurality of signal electrodes and scanning the plurality of scanning electrodes sequentially along the rows of scanning electrodes in one scanning direction thereby to form an optical image in the liquid crystal panel;

converging means for converging light emitted from a light source into convergent light and directing the convergent light into the liquid crystal panel through the first transparent substrate for being modulated by the optical image formed in the liquid crystal panel and being outputted through the second transparent substrate as a modulated light; and projector means for projecting the modulated light from the liquid crystal panel onto a screen to form an enlargement of the image on the screen;

said liquid crystal material having each of the liquid crystal molecules thereof in the middle of the distance between said first and second transparent substrates oriented for having the angles between a molecular axis of each liquid crystal molecule and the direction of the convergent light rays are the same at the middle of the distance from the first transparent substrate to the second transparent substrate when the signal voltages applied to all of the pixel electrodes are the same.

2. A liquid crystal image projection system comprising:

an active matrix liquid crystal panel having first and second transparent substrates in spaced opposed parallel relation to each other and spaced a distance from each other, and a layer of liquid crystal material contained between said transparent substrates, one of said first and second transparent substrates having a common electrode thereon;

first and second orientation films disposed between the liquid crystal material layer and the first transparent substrate and between the liquid crystal material layer and the second transparent substrate, respectively;

a plurality of pixel electrodes on the other of said transparent substrates arranged in a matrix, a plurality of switching elements connected to the plurality of pixel electrodes, respectively, a plurality of signal electrodes arranged in columns for supplying signal voltages to the plurality of pixel electrodes through the plurality of switching elements, and a plurality of scanning electrodes arranged in rows for selectively activating the plurality of switching elements on a row by row basis;

drive means responsive to an image signal for driving the liquid crystal panel by supplying the signal voltgages to the plurality of signal electrodes and scanning the plurality of scanning electrodes sequentially along the rows of scanning electrodes in one scanning direction thereby to form an optical image in the liquid crystal panel;

converging means for converging light emitted from a light source into convergent light and directing the convergent light into the liquid crystal panel through the first transparent substrate for being modulated by the optical image formed in the liquid crystal panel and being outputted through the second transparent substrate as a modulated light; and projector means for projecting the modulated light from the liquid crystal panel onto a screen to form an enlargement of the image on the screen;

said first and second orientation films having been rubbed in respective rubbing directions which are substantially perpendicular to each other and the rubbing direction of the first orientation film being at an angle of substantially 45 degrees to the scanning direction;

said liquid crystal material layer having each of the liquid crystal molecules thereof in the middle of the distance between said first and second transparent substrates oriented for having the angle between the molecular axis thereof and a light ray of the convergent light passing through the liquid crystal molecule the same when the signal voltages applied to al of the pixel electrodes are the same.

3. A system as claimed in claim 2 wherein with the liquid crystal panel oriented for making the scanning direction vertical, the liquid crystal material has, relative to the scanning direction, an upper part above the center of the liquid crystal material layer in the scanning direction and an equal lower part below the center, and an angle formed by a light ray of the convergent light passing through the upper part and a light ray of the convergent light passing through the lower part has a size for causing the transmittances of the liquid crystal material layer in the upper and lower parts to be the same when the signal voltages are applied to all of the pixel electrodes are the same.

* * * * *